United States Patent
Rinaldi et al.

(10) Patent No.: US 11,321,123 B2
(45) Date of Patent: May 3, 2022

(54) DETERMINING AN OPTIMUM NUMBER OF THREADS TO MAKE AVAILABLE PER CORE IN A MULTI-CORE PROCESSOR COMPLEX TO EXECUTIVE TASKS

(71) Applicant: INTERNATIONAL BUSINESS MACHINES CORPORATION, Armonk, NY (US)

(72) Inventors: Brian Anthony Rinaldi, Tucson, AZ (US); Lokesh M. Gupta, Tucson, AZ (US); Kevin J. Ash, Tucson, AZ (US); Matthew J. Kalos, Tucson, AZ (US); Trung N. Nguyen, Vail, AZ (US); Clint A. Hardy, Tucson, AZ (US); Louis A. Rasor, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

(21) Appl. No.: 16/690,131

(22) Filed: Nov. 21, 2019

(65) Prior Publication Data
US 2021/0157635 A1 May 27, 2021

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/5027* (2013.01); *G06F 9/524* (2013.01); *G06F 13/20* (2013.01); *G06F 2209/5018* (2013.01)

(58) Field of Classification Search
CPC ........ G06F 9/4881; G06F 13/20; G06F 9/524; G06F 9/5027; G06F 2209/5018
See application file for complete search history.

(56) References Cited

U.S. PATENT DOCUMENTS 7,458,077 B2 11/2008 Duke
8,185,906 B2 5/2012 Muscarella
(Continued)

FOREIGN PATENT DOCUMENTS

CN 108681486 A 10/2018
WO 2017016480 A1 2/2017

OTHER PUBLICATIONS

Dancheva et al. "An OpenMP runtime profiler/configuration tool for dynamic optimization of the number of threads". MIPRO. IEEE. Opatija, Croatia. (Year: 2016).*

(Continued)

*Primary Examiner* — Adam Lee
(74) *Attorney, Agent, or Firm* — Konrad Raynes Davda & Victor LLP; David W. Victor

(57) ABSTRACT

Provided are a computer program product, system, and method for determining an optimum number of threads to make available per core in a multi-core processor complex to execute tasks. A determination is made of a first processing measurement based on threads executing on the cores of the processor chip, wherein each core includes circuitry to independently execute a plurality of threads. A determination is made of a number of threads to execute on the cores based on the first processing measurement. A determination is made of a second processing measurement based on the threads executing on the cores of the processor chip. A determination is made of an adjustment to the determined number of threads to execute based on the second processing measurement resulting in an adjusted number of threads. The adjusted number of threads on the cores is utilized to execute instructions.

23 Claims, 8 Drawing Sheets

(51) Int. Cl.
  *G06F 9/50* (2006.01)
  *G06F 13/20* (2006.01)
  *G06F 9/52* (2006.01)

(56) References Cited

U.S. PATENT DOCUMENTS

| | | | |
|---|---|---|---|
| 9,910,704 B1* | 3/2018 | Banerjee | G06F 9/505 |
| 2003/0158976 A1* | 8/2003 | Moczygemba | G06F 3/0601 |
| | | | 710/1 |
| 2005/0081204 A1 | 4/2005 | Schopp | |
| 2005/0138328 A1* | 6/2005 | Moy | G06F 9/3802 |
| | | | 712/205 |
| 2006/0095807 A1* | 5/2006 | Grochowski | G06F 9/3885 |
| | | | 713/324 |
| 2008/0022280 A1* | 1/2008 | Cherkasova | G06F 9/4881 |
| | | | 718/102 |
| 2009/0254917 A1* | 10/2009 | Ohtani | G06F 9/5027 |
| | | | 718/100 |
| 2011/0161969 A1* | 6/2011 | Arndt | G06F 9/4881 |
| | | | 718/103 |
| 2011/0296212 A1* | 12/2011 | Elnozahy | G06F 9/5044 |
| | | | 713/320 |
| 2012/0210097 A1* | 8/2012 | Oishi | G06F 9/54 |
| | | | 712/17 |
| 2012/0304183 A1* | 11/2012 | Yamashita | G06F 9/4881 |
| | | | 718/102 |
| 2013/0024871 A1* | 1/2013 | Gao | G06F 9/5083 |
| | | | 718/105 |
| 2013/0332711 A1* | 12/2013 | Leidel | G06F 9/3851 |
| | | | 712/227 |
| 2014/0143789 A1 | 5/2014 | Nadathur et al. | |
| 2015/0234640 A1* | 8/2015 | Tian | G06F 9/4881 |
| | | | 710/267 |
| 2015/0286586 A1* | 10/2015 | Yadav | G06F 12/1466 |
| | | | 711/152 |
| 2016/0328175 A1* | 11/2016 | Zhang | G06F 3/0659 |
| 2016/0328317 A1* | 11/2016 | Herzi | G06F 12/0875 |
| 2016/0335132 A1* | 11/2016 | Ash | G06F 9/505 |
| 2017/0102967 A1* | 4/2017 | Tian | G06F 13/24 |
| 2017/0177653 A1* | 6/2017 | Goda | G06F 16/2365 |
| 2017/0185452 A1* | 6/2017 | Cao | G06F 9/5083 |
| 2018/0004571 A1* | 1/2018 | Accapadi | G06F 11/3055 |
| 2019/0179636 A1* | 6/2019 | Kawahara | G06F 15/17312 |

OTHER PUBLICATIONS

Schwarzrock et al. "Potential Gains in EDP by Dynamically Adapting the Number of Threads for OpenMP Applications in Embedded Systems". VII Brazilian Symposium on Computing Systems Engineering. IEEE. (Year: 2017).*

K.K. Pusukuri, et al., "Thread Reinforcer: Dynamically Determining Number of Threads via OS Level Monitoring," 2011 IEEE International Symposium on Workload Characterization (IISWC), pp. 116-125.

Y.H. Cho, et al., "IBM Power Systems S922 S914 and S924: Technical Overview and Introduction", IBM Redpaper, Document No. REDP-5497-00, Jul. 2018, pp. 166.

E. Jew, "CPU Threading Efficiency How to Improve L2/L3 Cache Hits", [online][retrieved Oct. 14, 2019] pp. 3, http://archive.ibmsystemsmag.com/CMSTemplates/IBMSystemsMag/Pri . . . .

IBM, "POWER9 Microarchitectures—IBM", [online][retrieved Oct. 14, 2019] pp. 12, https://en.wikichip.org/wiki/ibm/microarchitectures/power9.

B. Thompto, "IBM POWER9 SMT Deep Dive Summit Training Workshop", IBM Corporation, 2018, pp. 19.

Wikipedia, "Simultaneous Multithreading", [online] [retrieved Oct. 14, 2019] pp. 3, https://en.wikipedia.org/wiki/Simultaneous_multithreading.

PCT International Search Report and Written Opinion dated Feb. 23, 2021, for Application No. PCTIB2020/060616, pp. 9.

K.K. Pusukur, et al., "Thread Reinforcer: Dynamically Determining Number of Threads via OS Level Monitoring", IEEE International Symposium on Workload Characterization, Nov. 8, 2011, pp. 116-125.

* cited by examiner

Thread Information

Thread Availability Information

Optimum Number of Threads for Range of I/O operations

| Input/Output (I/O) Range | Optimum Number of Threads |
|---|---|
| 0 to 500,000 | (Maximum Threads)/4 |
| 501,000 to 1,000,000 | (Maximum Threads)/2 |
| 1,000,001 to 1,500,000 | (Maximum Threads)*3/4 |
| Greater than 1,500,000 | Maximum Threads |

Optimum Number of Threads to I/O OPs

FIG. 5

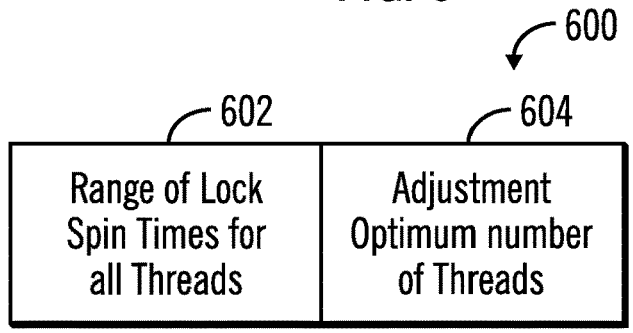

Lock Spin Time Thread Adjustment

FIG. 6

| Lock Spin Time (CPU Cycles) | Adjustment Optimum Number Threads |
|---|---|
| Less than 2% CPU Cycles | No Adjustment |
| 2% to 5% of CPU Cycles | 10% decrease |
| 5% to 10% of CPU Cycles | 20% decrease |
| 10% to 15% of CPU Cycles | 30% decrease |
| 15% to 20% of CPU Cycles | 40% decrease |
| Over 20% of CPU Cycles | 50% decrease |

Lock Spin Time Thread Adjustment

FIG. 7

DETERMINING AN OPTIMUM NUMBER OF THREADS TO MAKE AVAILABLE PER CORE IN A MULTI-CORE PROCESSOR COMPLEX TO EXECUTIVE TASKS

BACKGROUND OF THE INVENTION

1. Field of the Invention

The present invention relates to a computer program product, system, and method for determining an optimum number of threads to make available per core in a multi-core processor complex to execute tasks.

2. Description of the Related Art

In a processor chip or complex providing simultaneous multi-threading, multiple cores on a processor chip may each implement multiple threads that may simultaneously execute to parallelize workloads. Each core on the processor chip requires hardware, cache, such as L1 and L2 caches, and pipelining hardware for that core. The threads on a core share the core hardware. Further, each thread may have dedicated resources in the core, such as a subset of pipeline resources and threads on the core can share caches, such as the L2 and L3 caches available for a core. Each core may also have a dedicated L1 cache.

The cores on the processor chip can run in different modes to dynamically change the number of threads on the cores that are available for processing or placed in an idle state. Typically, a user issues commands to control how many threads run on each core, which requires quiescing the scheduling of tasks to the core to process.

There is a need in the art for improved techniques for determining an optimal number of threads to run on each core in a multi-core system and changing the threads available to run on each core to implement the optimal number of threads.

SUMMARY

Provided are a computer program product, system, and method for determining an optimum number of threads to make available per core in a multi-core processor complex to execute tasks. A determination is made of a first processing measurement based on threads executing on the cores of the processor chip, wherein each core includes circuitry to independently execute a plurality of threads. A determination is made of a number of threads to execute on the cores based on the first processing measurement. A determination is made of a second processing measurement based on the threads executing on the cores of the processor chip. A determination is made of an adjustment to the determined number of threads to execute based on the second processing measurement resulting in an adjusted number of threads. The adjusted number of threads on the cores is utilized to execute instructions.

With the above embodiment, an optimum number of threads to execute on multiple cores in a multi-core processor is determined based on two different processing measurements to optimize on two different processing attributes. A first processing measurement is used to determine an optimum number of threads to optimize the first processing factor and then a second processing measurement is used to adjust the determined optimum number of threads to optimize on an alternative measurement to provide two factor optimization.

In a further embodiment, the first processing measurement comprises a number of Input/Output (I/O) operations from threads executing on the cores of the processor complex and wherein the second processing measurement comprises a number of threads to execute on the cores based on the determined number of I/O operations.

With the above embodiment, the optimum number of threads is determined to optimize for a number of I/O operations, which would increase the number of available threads as the number of I/O operations increases to maintain performance as the I/O load increases.

In a further embodiment, an association of ranges of lock spin times and adjustments to the determined number of threads are maintained. A determination is made of an adjustment to the determined number of threads associated with a range of lock spin times including the determined lock spin time.

With the above embodiment, the optimum number is further adjusted and optimized based on the lock spin time to attempt to reduce the lock spin time, which impedes performance. As the lock spin time increases, the adjustment to reduce the number of threads increases to reduce available threads which reduces lock contention and overall system lock spin time.

In a further embodiment, the determined number of threads to execute on each core comprises less than a number of threads available to independently execute on each core. Tasks are only scheduled to execute on the determined number of threads on each core, leaving at least one thread idle on a plurality of the cores.

With the above embodiment, threads are effectively idled by only scheduling tasks to execute on the determined number of threads and not the idle threads. This avoids the need to take the processor complex offline to reconfigure available threads by leaving the processor cores online but using the scheduler to avoid scheduling tasks to idle cores.

In a further embodiment, the first processing measurement comprises lock spin time the threads executing in the cores wait to obtain locks on resources and the second processing measurement comprises at least one of a number of I/O operations from the threads executing on the cores and cross memory bus traffic among the cores and shared memory used by the cores.

With the above embodiment, the optimum number is selected based on lock spin time to reduce threads to reduce the lock spin time. The optimum number may further be adjusted, such as increased, depending on the number of operations to second optimize based on number of operations.

Further provided are a computer program product, system, and method for determining an optimum number of threads to make available per core in a multi-core processor complex to execute tasks. A determination is made of a number of Input/Output (I/O) operations from threads executing on the cores of the processor complex, wherein each core includes circuitry to independently execute a plurality of threads. A determination is made of a number of threads to execute on the cores based on the determined number of I/O operations. The determined number of threads on the cores are utilized to execute instructions.

With the above embodiment, the optimum number of threads is determined based on the I/O operations to select an optimum number based on the level of I/O operations in the complex to maintain performance as the number of I/O operations increases.

Further provided are a computer program product, system, and method for determining an optimum number of threads to make available per core in a multi-core processor complex to execute tasks. A determination is made of a lock spin time the threads executing in the cores wait to obtain locks on computational resources. A determination is made of a number of threads to execute on the cores based on the determined lock spin time. The determined number of threads on the cores is utilized to execute instructions.

With the above embodiment, the optimum number of threads is determined based on the lock spin time all threads wait to access computational resources to select an optimum number to reduce lock contention and lock spin time, which improves system performance by reducing latency to obtain locks.

BRIEF DESCRIPTION OF THE DRAWINGS

FIG. 5 illustrates an embodiment of an optimum threads for I/O operations table.

FIG. 6 illustrates an embodiment of a lock spin time adjustment for an optimum number of threads for a range of lock spin times for all threads.

FIG. 7 illustrates an embodiment of a lock spin time adjustments table to adjust the optimum number of threads.

DETAILED DESCRIPTION

Described embodiments provide improvements to computer technology for determining an optimum number of threads to execute on cores of a processor complex to provide simultaneous multi-threading of tasks on the threads. Described embodiments determine an optimum number of threads to execute on cores of the processor complex that considers one or more processing measurements to optimize performance based on two different processing measurements.

Described embodiments provide further improvements to operations to adjust the optimum number of threads to make available on each processor core by indicating the optimum number of threads per core as available and other cores as idle in thread availability information so that tasks are only scheduled on those threads indicated as available in a core. This avoids delays resulting in taking cores offline to reconfigure the threads that are available or idle in each core by having the available and idle threads indicated in separate thread availability information.

Described embodiments may determine an optimum number of threads to make available per core that considers multiple processing measurements and attributes such as number of I/O operations from the threads executing on the cores, cross memory bus traffic among the cores, shared memory used by the cores, lock spin time the threads executing in the cores wait to obtain locks on resource, etc. In one embodiment, the optimum number of threads may be determined by first determining an optimum number of threads to execute on the cores based on the determined number of I/O operations and then determining an adjustment to the determined optimum number of threads to execute based on a determined lock spin time the threads spend waiting for locks to computational resources to become available.

Figure 1:
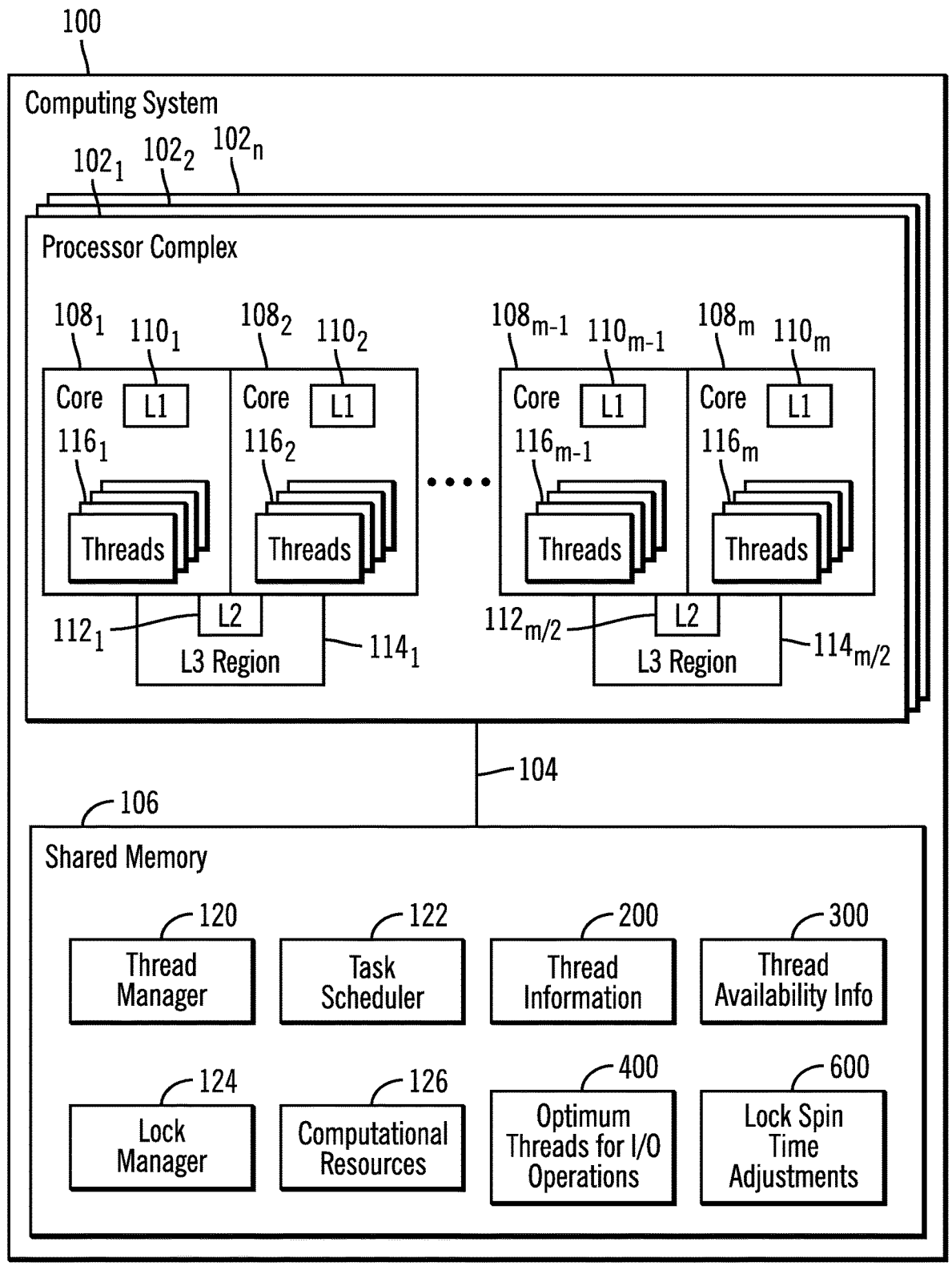
FIG. 1 illustrates an embodiment of a computing environment.

FIG. 1 illustrates an embodiment of a computing system 100 having a plurality of processor complexes $102_1$, $102_2 \ldots 102_n$ that may access a shared memory 106 over a memory interface 104. Each processor complex $102_i$ may include a plurality of processing cores $108_1$, $108_2$, $108_{m-1}$, $108_m$ each having an on-board L1 cache $110_1$, $110_2$, $110_{m-1}$, $110_m$. Each pair of cores, such as $108_1$, $108_2$ and $108_{m-1}$, $108_m$ may share an L2 cache $112_1 \ldots 112_{m/2}$ and a larger L3 cache $114_1 \ldots 114_{m/2}$, such as with the International Business Machines ("IBM"®) POWER9® processor. Each processor complex $102_i$ may comprise a single chip module (SCM). The L3 cache $114_i$ may comprise an embedded Dynamic Random Access Memory (DRAM).

Each core $108_i$ may include hardware and circuitry for independently executing threads $116_i$ to allow for parallelization of workloads and simultaneous multithreading of threads $116_i$ across the cores $108_1$, $108_2$ and $108_{m-1}$, $108_m$. Simultaneous multithreading allows a single core $108_i$ to simultaneously dispatch instructions from different threads $116_i$.

The shared memory 106 includes program components executed by one or more of the threads $116_i$, including a thread manager 120 to manage availability of the threads $116_i$ in the cores $108_i$; a task scheduler 122 to schedule tasks to the threads $116_i$; thread information 200 having information on processing of I/O operations and lock spin times threads $116_i$ wait to obtain locks on resources; thread availability information 300 indicating availability of the threads $116_i$ on the cores $108_i$ to receive tasks; a lock manager 124 to manage access of locks to computational resources 126 in the system 100, such as read/write queues, Least Recently Used (LRU) lists, storage, processing and other computational resources; an optimum threads for I/O operations 400 providing optimum numbers of threads to make available for different ranges of I/O operations; and lock spin time adjustments 600 providing adjustments to the optimum number of threads for different ranges of lock spin times.

In alternative embodiments, there may be different arrangements of the cores in sharing L2 and L3 cache than shown in FIG. 1.

In the embodiment of FIG. 1, the memory 106 is external to the processor complexes $102_1 \ldots 102_n$. In alternative embodiments, each processor complex $102_i$ may include a shared memory for all the cores $108_i$ embedded on the processor complex $102_i$. The program components 120, 122, 124 and data 200, 300, 400, and 500 are shown in the shared memory 106. In further embodiments, some or all of these program components and information may be maintained in the L3 $114_i$ or L2 $112_i$ caches. The L2 cache $112_i$ may be used to cache data evicted from the L1 cache $110_i$ and the L3 cache $114_i$ may be used to cache data evicted from the L2 cache $112_i$.

In one embodiment, each processor complex $102_i$ may maintain a separate instance of the program components 120, 122, 124 and data 200, 300, 400, and 500 in the shared memory 106. In further embodiments, there may be one set of the program components 120, 122, 124 and data 200, 300, 400, and 500 to manage assignment of threads across processor complexes $102_1 \ldots 102_n$.

The term "processor complex" may also be referred to as a "processing unit", "processor", "processor chip", etc. The cores $108_i$ may implement the threads $116_i$ in hardware circuitry to execute tasks in one or more integrated circuit dies. Further, the processor complex, cores, and threads may comprise a virtual processing components performing operations with respect to a virtual processor complex, cores, threads, memory and cache, which are implemented in a physical host processing and memory resources.

In certain embodiments, the computing system 100 comprises a storage controller providing access to shared non-volatile storage.

The memory 106 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Direct In-Line Memory Modules (DIMMs), NAND storage, e.g., flash memory, Solid State Drive (SSD) storage, non-volatile RAM, etc.

Figure 2:
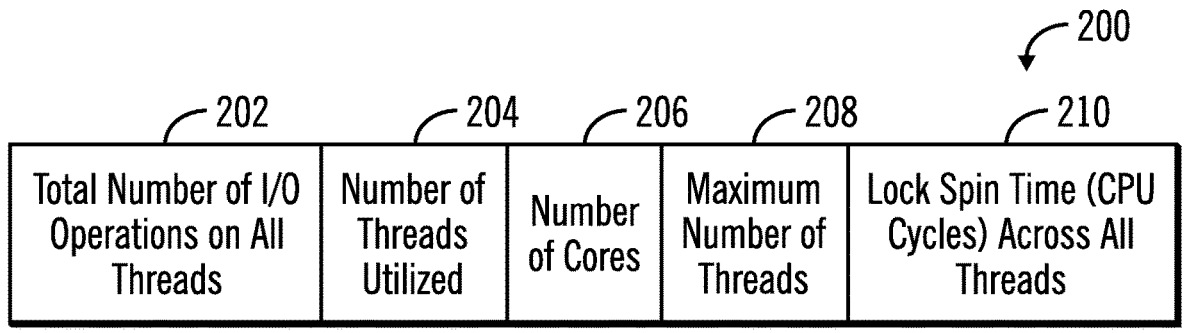
FIG. 2 illustrates an embodiment of thread information for the threads implemented in the cores of a processor complex.

FIG. 2 illustrates an embodiment of the thread information 200 maintained for threads $116_i$ in cores $108_i$ of one processor complex $102_i$ and includes: a total number of I/O operations performed on all threads $116_1 \ldots 116_m$ in the processor complex $102_i$ during a measurement period; a number of threads utilized 204, which may comprise less than all the threads $116_1 \ldots 116_m$, leaving some threads on each core $108_i$ idle; a number of cores 206 on the processor complex $102_i$; a maximum number of threads 208 available in the processor complex $102_i$ implemented in all the cores $108_i$; lock spin time across all threads 210, such as in processor cycles, that all the threads $116_1 \ldots 116_m$ have to wait to obtain a lock from the lock manager 124 to access computational resources 126.

Figure 3:
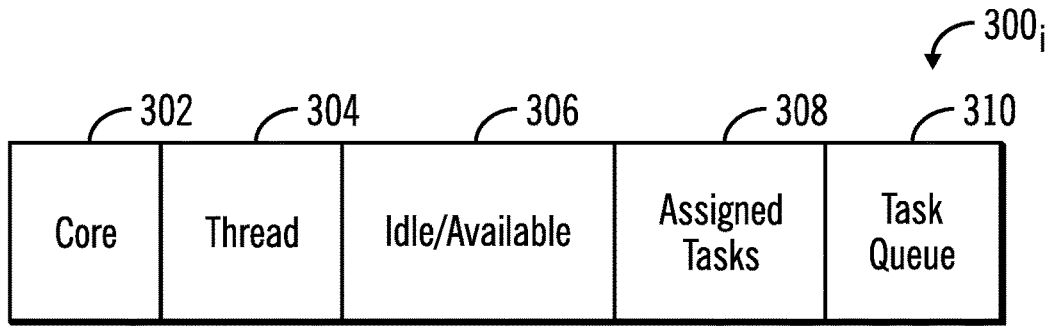
FIG. 3 illustrates an embodiment of thread availability information for a thread implemented on a core.

FIG. 3 illustrates an embodiment of thread availability information 3001 maintained for a particular core $108_i$ and thread $116_j$, and includes: the core 302; the thread 304; idle/available flag 306 indicating whether the thread 304 is idle and not receiving tasks or available to receive tasks from the task scheduler 122; assigned tasks 308 assigned to the thread 304 on the core 406; and a task queue 310 queueing assigned tasks for the thread 304 to execute. The task scheduler 122 may use load balancing to assign tasks to threads $116_j$ in the cores $108_i$ in a processor complex $102_i$.

Figure 4:
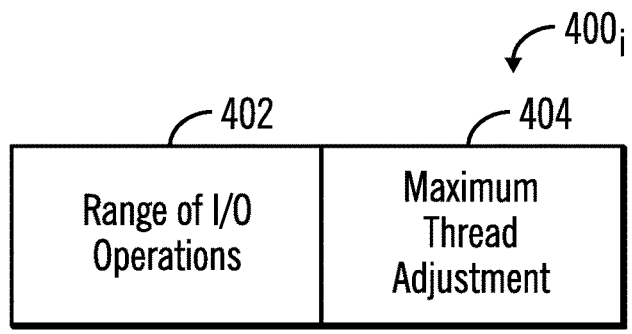
FIG. 4 illustrates an embodiment of an optimum number of threads for a range of Input/Output (I/O) operations.

FIG. 4 illustrates an embodiment of an entry $400_i$ in the optimum threads for I/O operations and includes: a range of I/O operations 402 and a maximum thread adjustment 404 for the range 402. For instance, the adjustment 404 may comprise a percentage of the maximum number of threads 208, which percentage increases for ranges of a greater number of I/O operations because more threads are needed to process greater number of I/O operations to maintain system 100 performance.

FIG. 5 provides an example of an embodiment of the optimum threads for I/O operations table 500, such as table 400, as providing different percentages of the maximum number of threads 208 for different ranges of I/O operations, where the optimum number of threads increases for higher ranges of I/O operations.

FIG. 6 illustrates an embodiment of an entry $600_i$ in the lock spin time thread adjustment table 600 and includes: a range of lock spin times, in CPU cycles, for all threads 602 for a measurement time period; and a corresponding adjustment to the optimum number of threads 604. The adjustment 604 may comprise a percentage to decrease the determined optimum number of threads, which percentage reduction increases for higher ranges of lock spin time 602. To reduce latency from high levels of lock spin times, the number of threads operating is reduced to reduce the amount of lock contention to access computational resources 126. Thus, as the lock spin time for all threads increases, the percentage reduction to the optimum number of threads increases to reduce the number of threads that contribute to lock contention.

FIG. 7 provides an example of an embodiment of the adjustments to the lock spin time thread adjustments table 600 as providing different percentage decreases to the optimum number of threads, where the percentage decrease increases for ranges of higher percentages of CPU cycles spent waiting for locks, i.e., the lock spin time.

Figure 8:
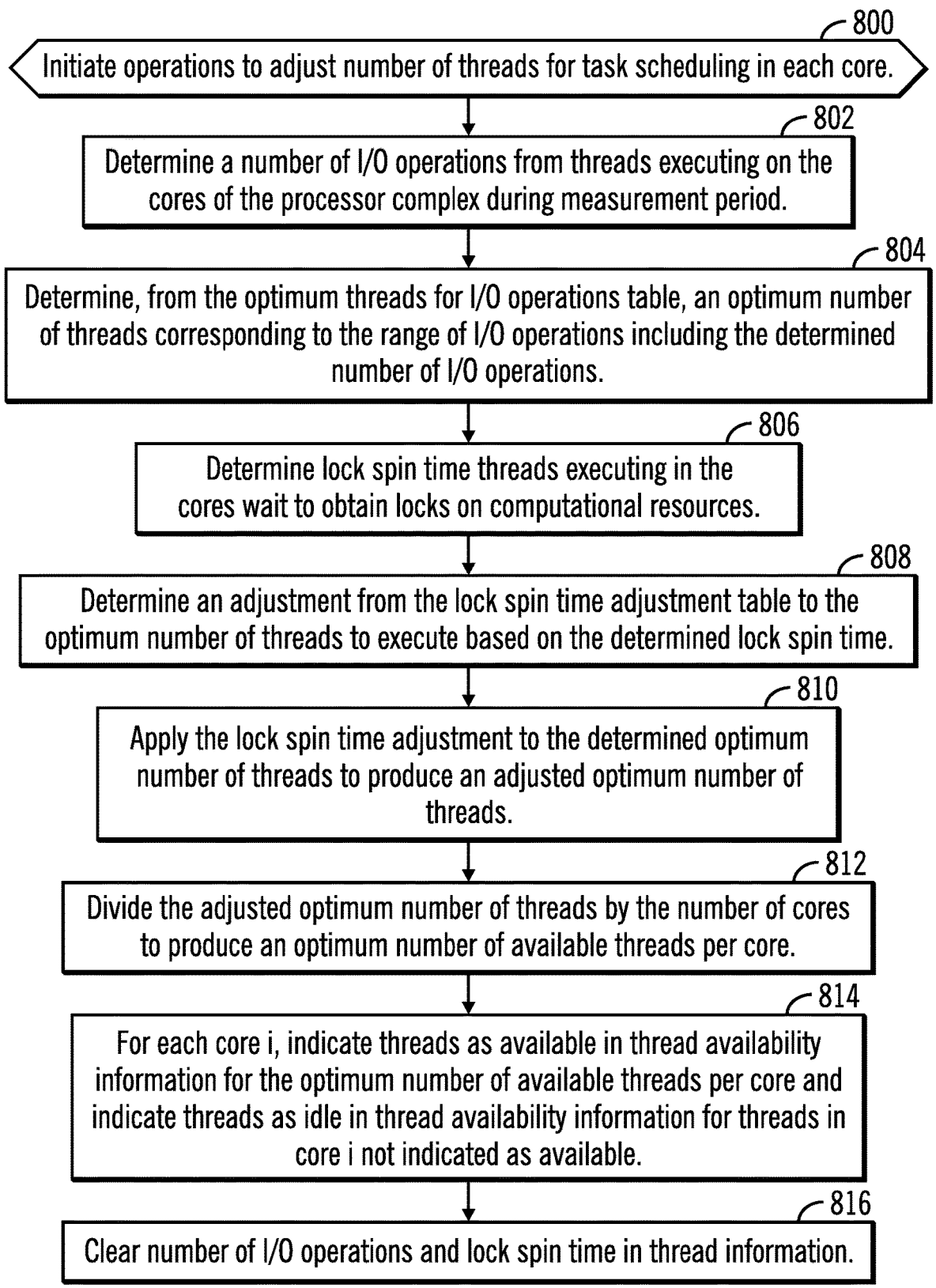
FIG. 8 illustrates an embodiment of operations to determine and use an optimum number of threads per core based on I/O operations and lock spin time.

FIG. 8 illustrates an embodiment of operations performed by the thread manager 120 to determine threads to make available to the task scheduler 122 to execute tasks and threads $116_i$ to idle. The operations of FIG. 8 may be periodically performed to adjust the number of threads $116_i$ per core $108_i$ to minimize both I/O operation processing latency and lock contention. Upon initiating (at block 800) operations to adjust the number of threads $116_i$ for task scheduling in each core $108_j$, the thread manager 120 determines (at block 802) a total number of I/O operations 202 from threads $116_1 \ldots 116_m$ executing on the cores $108_1 \ldots 108_m$ of the processor complex $102_i$ during a measurement period. A determination is made (at block 804) from the optimum threads for I/O operations table 400, such as table 500 (FIG. 5), of an optimum number of threads 404 corresponding to the range of I/O operations 402 including the determined total number of I/O operations across threads 202. The determined optimum number of threads comprises the maximum number of threads 208 per core $108_i$ adjusted by a percentage specified in field 404 of the determined entry $400_i$ having the range of I/O operations 402 including the determined number of I/O operations on the cores $108_i$ during the measurement period.

The thread manager 120 determines (at block 806) a lock spin time all threads $116_1 \ldots 116_m$ executing in the cores $108_1 \ldots 108_m$ wait 210 to obtain locks on computational resources 126. A determination is made (at block 808) of an adjustment 604 to the determined optimum number of threads from the lock spin time adjustment table 600 based on the determined lock spin time. For instance, the entry $600_i$ in the lock spin time adjustments table 600 is determined having a range of lock spin times 602 including the determined lock spin time all threads $116_i$ waited 210 and the adjustment 604 is determined from the determined entry $600_i$. The determined adjustment is applied (at block 810) to the determined optimum number of threads to produce an adjusted optimum number of threads. The adjusted optimum number of threads, optimizing both I/O operation performance and lock contention, is divided (at block 812) by the number of cores 206 to produce an optimum number of available threads per core. For each core $108_i$, the thread manager 120 indicates (at block 814) threads as available in thread availability information $300_i$ for the optimum number of available threads per core in core $108_i$ and indicate threads as idle in thread availability information $300_i$ for threads in core $108_i$ not indicated as available. For instance, if there are four threads per core and three threads are the optimum number of threads per core to be available, then the thread availability information $300_i$ for three threads (optimum number) indicates those threads as available in field 306 and the thread availability information $300_i$ for one thread indicates that one thread as idle in field 306. The number of I/O operations on all threads 202 and lock spin time across all threads 210 is cleared (at block 816) so that new measurements are made for the next measurement time period to be used in the next instance of operations of FIG. 8 to adjust the optimum number of available threads.

With the embodiment of FIG. 8, an optimum number of threads per core to make available is determined to optimize the available number of threads so as to minimize I/O operation latency by increasing the number of threads as I/O operations in the system 100 increases and reducing the number of threads as lock spin time increases due to increased lock contention resulting from more threads operating in parallel.

Further described embodiments avoid delays in adjusting the optimum number of threads available in the processor complex $102_i$ by updating thread availability information 300 in memory 106 to indicate the available and idle threads. The task scheduler 122 only schedules tasks on threads $116_i$ indicated as available in the thread availability information $300_i$. In this way, the number of threads per core made available and idle is updated without having to reconfigure the cores $108_i$.

Figure 9:
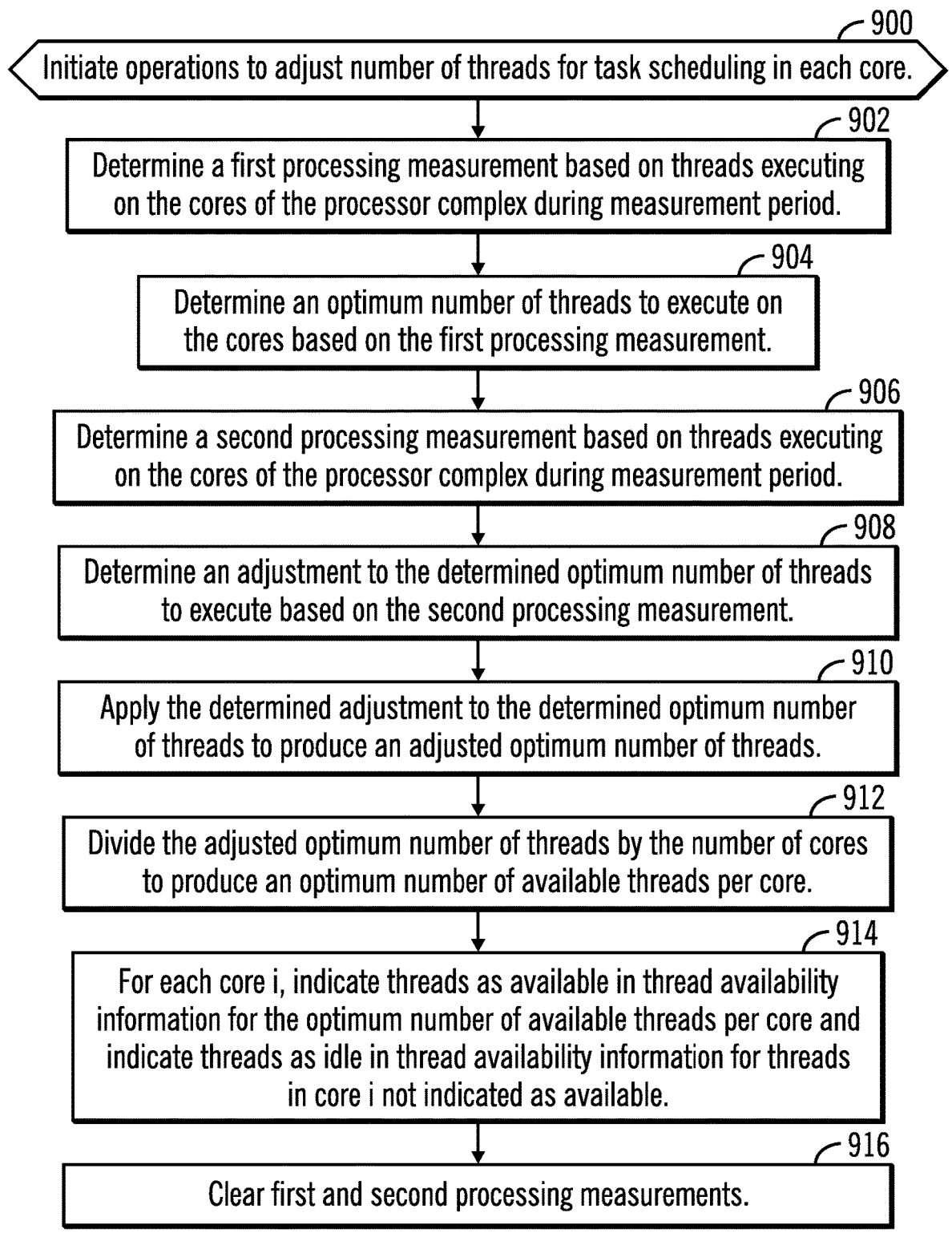
FIG. 9 illustrates an additional embodiment of operations to determine and use an optimum number of threads per core based and first and second processing measurements.

FIG. 9 illustrates an additional embodiment of operations performed by the thread manager 120 to determine threads to make available to the task scheduler 122 to execute tasks and threads $116_i$ to idle. The operations of FIG. 9 may be periodically performed to adjust the number of threads $116_i$ per core $108_i$ to optimize on multiple factors. Upon initiating (at block 900) operations to adjust the number of threads $116_i$ for task scheduling in each core $108_j$, the thread manager 120 determines (at block 802) a first processing measurement based on threads $116_1 \ldots 116_m$ executing on the cores $108_1 \ldots 108_m$ of the processor complex $102_i$ during a measurement period. A determination is made (at block 904) of an optimum number of threads to execute on the cores $108_1 \ldots 108_m$ based on the first processing measurement.

The thread manager 120 determines (at block 906) a second processing measurement based on threads $116_1 \ldots 116_m$ executing on the cores $108_1 \ldots 108_m$ of the processor complex $102_i$ during the measurement period. A determination is made (at block 908) of an adjustment to the determined optimum number of threads based on the second processing measurement. The determined adjustment is applied (at block 910) to the determined optimum number of threads to produce an adjusted optimum number of threads. The adjusted optimum number of threads, optimizing based on both the first and second processing measurements, is divided (at block 912) by the number of cores 206 to produce an optimum number of available threads per core. For each core $108_i$, the thread manager 120 indicates (at block 914) threads as available in thread availability information $300_i$ for the optimum number of available threads per core in core $108_i$ and indicate threads as idle in thread availability information $300_i$ for threads in core $108_i$ not indicated as available. For instance, if there are four threads per core and three threads are the optimum number of threads per core to be availability, then the thread availability information $300_i$ for three threads (optimum number) indicates those threads as available in field 306 and the thread availability information $300_i$ for one thread indicates that one thread as idle in field 306. The first and second processing measurements are cleared (at block 916) so that new measurements are made for the next measurement time period to be used in the next instance of operations of FIG. 9 to adjust the optimum number of available threads.

With the embodiment of operations of FIG. 9 an optimum number of threads per core to make available is determined to optimize the available number of threads based on multiple different processor measurements. In one embodiment, the first processing measurement may comprise at least one of a number of I/O operations from the threads executing on the cores, cross memory bus traffic among the cores, memory operations, etc., and the second processing measurement may comprise lock spin time the threads executing in the cores wait to obtain locks on resources. In a further embodiment, the first processing measurement may comprise lock spin time the threads executing in the cores wait to obtain locks on resources and the second processing measurement comprises at least one of a number of I/O operations from the threads executing on the cores and cross memory bus traffic among the cores, shared memory used by the cores, etc. Additional computational resource usage that affects system performance may also be considered for the first and second processing measurements to optimize on multiple processing measurements.

Figure 10:
FIG. 10 illustrates an embodiment of an optimum number of threads for lock spin time ranges table.
Figure 11:
FIG. 11 illustrates an embodiment of I/O operations adjustments table to adjust the optimum number of threads.

FIGS. 10 and 11 provide an embodiment of the adjustment tables when the first processing measurement comprises a lock spin time the threads executing in the cores wait to obtain locks on resources and the second processing measurement comprises the number of I/O operations from the threads executing on the cores. FIG. 10 shows how percentages of lock spin times 1002 map to different numbers of optimum number of threads 1004, where the optimum number of threads are calculated as a percentage of the maximum number of threads 208 available on the cores $108_1 \ldots 108_n$. The different ranges of lock spin times 1002 thus map to different percentages of the maximum number of threads 1004.

After the optimum number of threads is calculated using FIG. 10 and the lock spin times, then an adjustment to the optimum number of threads may be determined by ranges of I/O operations as shown in FIG. 11. FIG. 11 shows adjustments to the optimum number of threads 1104 for different I/O ranges 1102. As the ranges of I/O operations 1102 increase, then there is less of an adjustment 1104 to the determined optimum number of threads because more threads are needed to maintain performance for greater ranges of I/O operations.

Figure 12:
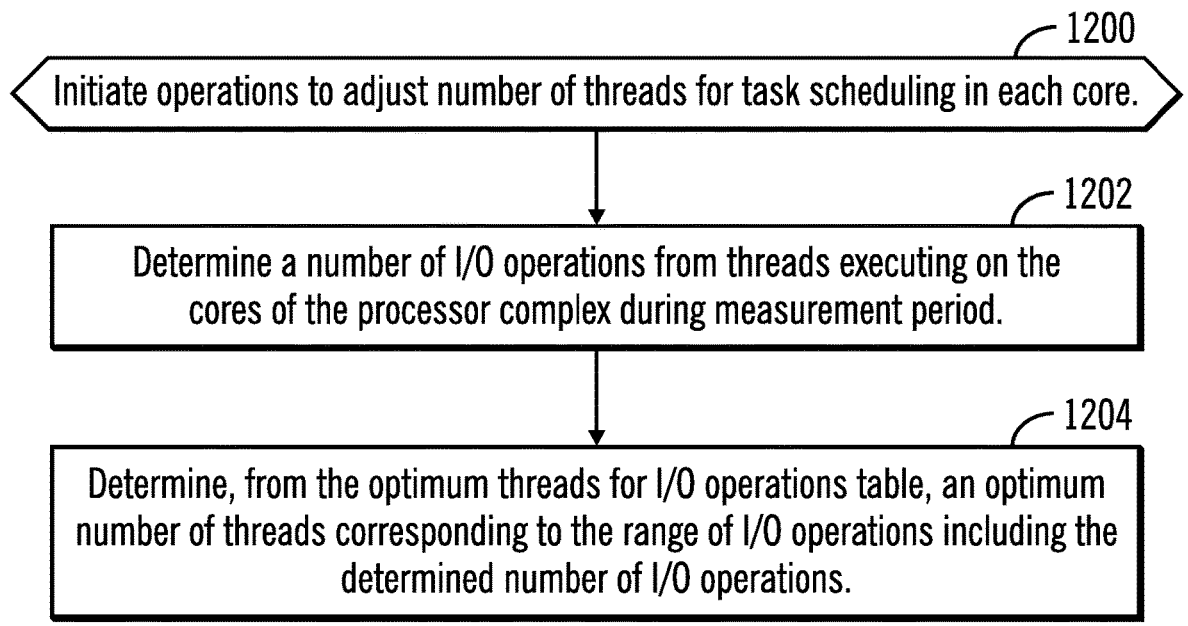
FIG. 12 illustrates an embodiment of operations to determine and use an optimum number of threads per core based on I/O operations.

FIG. 12 illustrates an additional embodiment of operations performed by the thread manager 120 to determine threads to make available to the task scheduler 122 to execute tasks and threads $116_i$ to idle based only on the number of I/O operations. The operations of FIG. 12 may be periodically performed to adjust the number of threads $116_i$ per core $108_i$ to minimize both I/O operation processing latency and lock contention. Upon initiating (at block 1200) operations to adjust the number of threads $116_i$ for task scheduling in each core $108_j$, the thread manager 120 determines (at block 1202) a total number of I/O operations 202 from threads $116_1 \ldots 116_m$ executing on the cores $108_1 \ldots 108_m$ of the processor complex $102_i$ during a measurement period. A determination is made (at block 1204) from the optimum threads for I/O operations table 400, such as the table in FIG. 5, of an optimum number of threads 404 corresponding to the range of I/O operations 402 including the determined total number of I/O operations across threads 202. The determined optimum number of threads comprises the maximum number of threads 208 per core $108_i$ adjusted by a percentage specified in field 404 of the determined entry $400_i$ having the range of I/O operations 402 including the determined number of I/O operations on the cores $108_i$ during the measurement period.

Figure 13:
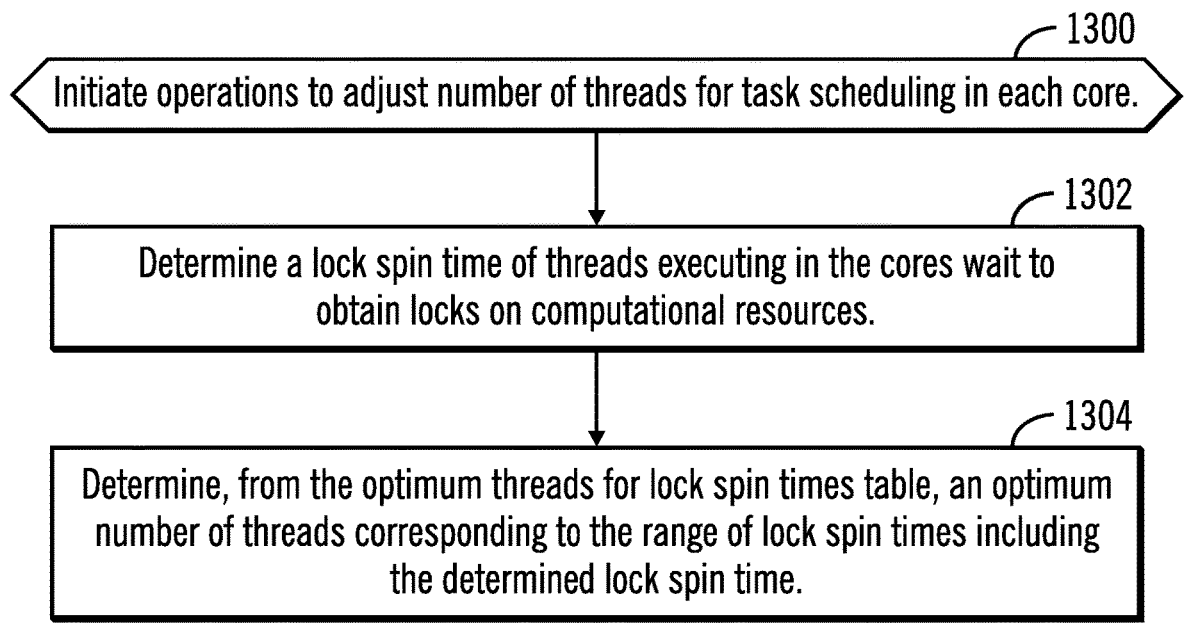
FIG. 13 illustrates an embodiment of operations to determine and use an optimum number of threads per core based on lock spin times.

FIG. 13 illustrates an additional embodiment of operations performed by the thread manager 120 to determine threads to make available to the task scheduler 122 to execute tasks and threads $116_i$ to idle based only one the lock spin time 210 all the threads executing on all the cores wait to obtain locks on computational resources. The operations of FIG. 13 may be periodically performed to adjust the number of threads $116_i$ per core $108_i$ to minimize both I/O operation processing latency and lock contention. Upon initiating (at block 1300) operations to adjust the number of threads $116_i$ for task scheduling in each core $108_j$, the thread manager 120 determines (at block 1302) a lock spin time all threads $116_1 \ldots 116_m$ executing in the cores $108_1 \ldots 108_m$ wait 210 to obtain locks on computational resources 126. A determination is made (at block 1304) from the optimum threads for lock spin times 1000 (FIG. 10) of a percentage of the maximum number of threads 1004, comprising the optimum number of threads, corresponding to the range of lock spin times 1002 including the determined lock spin time 120 across all threads 202. The determined optimum number of threads 1004 comprises the maximum number of threads 208 per core $108_i$ adjusted by a percentage specified in the column 1004 of FIG. 10 for the determined lock spin time range 1002 including the determined lock spin time 210 across all threads during the measurement period.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
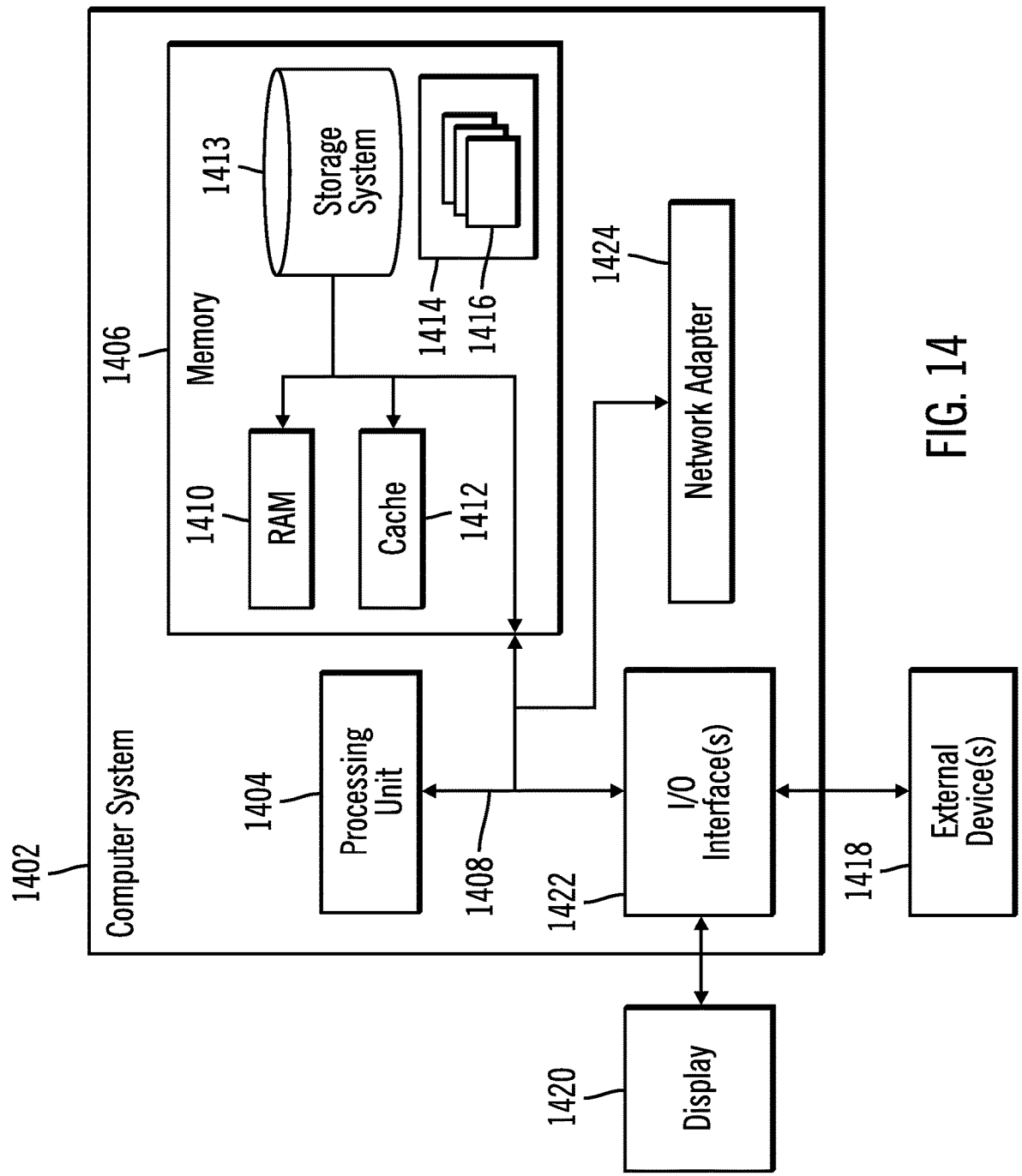
FIG. 14 illustrates a computing environment in which the components of FIG. 1 may be implemented.

The computational components of FIG. 1 may be implemented in one or more computer systems, such as the computer system 1402 shown in FIG. 14. Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system/server 1402 is shown in the form of a general-purpose computing device. The components of computer system/server 1402 may include, but are not limited to, one or more processors or processing units 1404, such as the processor complexes $102_i$ in FIG. 1, a system memory 1406, such as the shared memory 106 in FIG. 1, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data.

Each of the operating system, one or more application programs, other program modules, and program data or some combination thereof, may include an implementation of a networking environment. The components of the computer 1402 may be implemented as program modules 1416 which generally carry out the functions and/or methodologies of embodiments of the invention as described herein. The systems of FIG. 1 may be implemented in one or more computer systems 1402, where if they are implemented in multiple computer systems 1402, then the computer systems may communicate over a network.

Computer system/server 1402 may also communicate with one or more external devices 1418 such as a keyboard, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining a number of threads for execution in cores of a processor complex, wherein the computer program product comprises a computer readable storage medium having computer readable program code embodied therein that when executed performs operations, the operations comprising:
    determining a first processing measurement based on a number of threads greater than zero that are executing on the cores of the processor complex, wherein each core includes circuitry to independently execute a plurality of threads;
    determining an optimal number of threads to make available to execute on the cores based on the first processing measurement, wherein the optimal number is greater than zero;
    determining a second processing measurement based on the number of threads that are executing on the cores, wherein the first processing measurement is different than the second processing measurement;
    determining an adjustment based on the second processing measurement;
    applying the adjustment to the optimal number of threads resulting in an adjusted number of threads greater than zero that is different from the optimal number of threads to make available to execute on the cores;
    allocating the adjusted number of threads among the cores to determine an available number of threads for each of the cores;
    for each core of the cores, performing:
        indicating at least one of the available number of threads determined for the core as available to execute instructions; and
        indicating at least one of the available number of threads determined for the core as idle; and
    executing the instructions on the cores utilizing the available number of threads.

2. The computer program product of claim 1, wherein the determining the first processing measurement comprises determining a number of Input/Output (I/O) operations from the number of threads executing on the cores, and wherein the determining the adjustment is based on a lock spin time of the number of threads.

3. The computer program product of claim 2, wherein the determining the optimal number of threads to execute comprises:
    maintaining an association of a plurality of ranges of a number of I/O operations and adjustments to a maximum number of threads that are available to execute on the cores;
    determining an adjustment to the maximum number of threads associated with a range of I/O operations including the determined number of I/O operations; and
    calculating the optimal number of threads by applying the determined adjustment to the maximum number of threads available to execute on the cores.

4. The computer program product of claim 3, wherein the adjustments comprise reducing the maximum number of threads by a percentage, wherein the percentage decreases for higher ranges of I/O operations.

5. The computer program product of claim 1, wherein the determining the second processing measurement comprises determining a lock spin time the number of threads executing in the cores wait to obtain locks on resources, wherein the determining the adjustment to the determined optimal number of threads based on the determined lock spin time comprises:
    maintaining an association of ranges of lock spin times and adjustments to a number of threads; and
    determining an adjustment to the optimal number of threads associated with a range of lock spin times including the determined lock spin time.

6. The computer program product of claim 5, wherein the adjustment to the determined optimal number of threads comprises reducing the determined optimal number of threads by a percentage, wherein the percentage increases for higher ranges of lock spin times.

7. The computer program product of claim 1, wherein the operations further comprise:
    scheduling tasks to only execute on the at least one of the available number of threads indicated as available to execute.

8. The computer program product of claim 1, wherein the first processing measurement comprises a lock spin time the number of threads executing in the cores wait to obtain locks on resources, and wherein the second processing measurement comprises at least one of a number of I/O operations from the threads executing on the cores and cross memory bus traffic among the cores and shared memory used by the cores.

9. The computer program product of claim 1, wherein the indicating the at least one of the available number of threads as idle comprises indicating all the available number of threads not indicated as available to execute instructions as idle.

10. A computer program product for determining a number of threads for execution in cores of a processor complex, wherein the computer program product comprises a computer readable storage medium having computer readable program code embodied therein that when executed performs operations, the operations comprising:
   determining a number of Input/Output (I/O) operations from a first number of threads greater than zero executing on the cores of the processor complex, wherein each core includes circuitry to independently execute a plurality of threads;
   maintaining an association of a plurality of ranges of I/O operations and adjustments to a maximum number of threads that are available to execute on the cores;
   determining an adjustment to the maximum number of threads associated with a range of I/O operations including the determined number of I/O operations;
   calculating an optimal number of threads by applying the determined adjustment to the maximum number of threads available to execute on the cores, wherein the optimal number of threads is greater than zero and different from the first number of threads; and
   executing instructions utilizing the optimal number of threads on the cores.

11. A computer program product for determining a number of threads for execution in cores of a processor complex, wherein the computer program product comprises a computer readable storage medium having computer readable program code embodied therein that when executed performs operations, the operations comprising:
   determining a lock spin time based on a first number of threads executing in the cores wait to obtain locks on computational resources;
   maintaining an association of a plurality of ranges of lock spin times and adjustments to a maximum number of threads that are available to execute on the cores;
   determining an adjustment to the maximum number of threads associated with a range of lock spin times including the determined lock spin time; and
   calculating an optimal number of threads by applying the determined adjustment to the maximum number of threads available to execute on the cores, wherein the optimal number of threads is greater than zero and different from the first number of threads; and
   executing instructions utilizing the optimal number of threads on the cores.

12. A system, comprising:
   a processor complex having a plurality of cores executing threads; and
   a computer readable storage medium having computer readable program code embodied therein that when executed on at least one of the cores performs operations, the operations comprising:
      determining a first processing measurement based on a number of threads greater than zero that are executing on the cores of the processor complex, wherein each core includes circuitry to independently execute a plurality of threads;
      determining an optimal number of threads to make available to execute on the cores based on the first processing measurement, wherein the optimal number is greater than zero;
      determining a second processing measurement based on the first number of threads that are executing on the cores, wherein the first processing measurement is different than the second processing measurement;
      determining an adjustment based on the second processing measurement;
      applying the adjustment to the optimal number of threads resulting in an adjusted number of threads greater than zero that is different from the optimal number of threads to make available to execute on the cores;
      allocating the adjusted number of threads among the cores to determine an available number of threads for each of the cores;
      for each core of the cores, performing:
         indicating at least one of the available number of threads determined for the core as available to execute instructions; and
         indicating at least one of the available number of threads determined for the core as idle; and
      executing the instructions on the cores utilizing the available number of threads.

13. The system of claim 12, wherein the determining the first processing measurement comprises determining a number of Input/Output (I/O) operations from the number of threads executing on the cores, and wherein the determining the adjustment is based on a lock spin time of the number of threads.

14. The system of claim 13, wherein the determining the optimal number of threads to execute comprises:
   maintaining an association of a plurality of ranges of a number of I/O operations and adjustments to a maximum number of threads that are available to execute on the cores;
   determining an adjustment to the maximum number of threads associated with a range of I/O operations including the determined number of I/O operations; and
   calculating the optimal number of threads by applying the determined adjustment to the maximum number of threads available to execute on the cores.

15. The system of claim 12, wherein the determining the second processing measurement comprises determining a lock spin time the number of threads executing in the cores wait to obtain locks on resources, wherein the determining the adjustment to the determined optimal number of threads based on the determined lock spin time comprises:
   maintaining an association of ranges of lock spin times and adjustments to a number of threads; and
   determining an adjustment to the optimal number of threads associated with a range of lock spin times including the determined lock spin time.

16. The system of claim 12, wherein the operations further comprise:
   scheduling tasks to only execute on the at least one of the available number of threads indicated as available to execute instruction.

17. The system of claim 12, wherein the indicating the at least one of the available number of threads as idle comprises indicating all the available number of threads not indicated as available to execute instructions as idle.

18. A method, comprising:
   determining a first processing measurement based on a number of threads greater than zero that are executing on cores of a processor complex, wherein each core includes circuitry to independently execute a plurality of threads;

determining an optimal number of threads to make available to execute on the cores based on the first processing measurement, wherein the optimal number is greater than zero;

determining a second processing measurement based on the number of threads that are executing on the cores, wherein the first processing measurement is different than the second processing measurement;

determining an adjustment based on the second processing measurement;

applying the adjustment to the optimal number of threads resulting in an adjusted number of threads greater than zero that is different from the optimal number of threads to make available to execute on the cores;

allocating the adjusted number of threads among the cores to determine an available number of threads for each of the cores;

for each core of the cores, performing:
indicating at least one of the available number of threads determined for the core as available to execute instructions; and
indicating at least one of the available number of threads determined for the core as idle; and executing the instructions on the cores utilizing the available number of threads.

19. The method of claim 18, wherein the determining the first processing measurement comprises determining a number of Input/Output (I/O) operations from the number threads executing on the cores, and wherein the determining the adjustment is based on a lock spin time of the number of threads.

20. The method of claim 19, wherein the determining the optimal number of threads to execute comprises:
maintaining an association of a plurality of ranges of a number of I/O operations and adjustments to a maximum number of threads that are available to execute on the cores;
determining an adjustment to the maximum number of threads associated with a range of I/O operations including the determined number of I/O operations; and
calculating the optimal number of threads by applying the determined adjustment to the maximum number of threads available to execute on the cores.

21. The method of claim 18, wherein the determining the second processing measurement comprises determining a lock spin time the number of threads executing in the cores wait to obtain locks on resources, wherein the determining the adjustment to the determined optimal number of threads based on the determined lock spin time comprises:
maintaining an association of ranges of lock spin times and adjustments to a number of threads; and
determining an adjustment to the optimal number of threads associated with a range of lock spin times including the determined lock spin time.

22. The method of claim 18, further comprising:
scheduling tasks to only execute on the at least one of the available number of threads indicated as available to execute instruction.

23. The method of claim 18, wherein the indicating the at least one of the available number of threads as idle comprises indicating all the available number of threads not indicated as available to execute instructions as idle.

* * * * *